United States Patent
Hugues

(10) Patent No.: US 10,065,545 B2
(45) Date of Patent: Sep. 4, 2018

(54) FOAM PART, IN PARTICULAR FOR A VEHICLE SEAT, AND VEHICLE SEAT

(71) Applicant: JOHNSON CONTROLS GMBH, Burscheid (DE)

(72) Inventor: Laurent Hugues, Soultz les Bain (FR)

(73) Assignee: JOHNSON CONTROLS GMBH, Burscheid (DE)

( * ) Notice: Subject to any disclaimer, the term of this patent is extended or adjusted under 35 U.S.C. 154(b) by 16 days.

(21) Appl. No.: 15/105,958

(22) PCT Filed: Dec. 15, 2014

(86) PCT No.: PCT/EP2014/077742
§ 371 (c)(1),
(2) Date: Jun. 17, 2016

(87) PCT Pub. No.: WO2015/091348
PCT Pub. Date: Jun. 25, 2015

(65) Prior Publication Data
US 2016/0318428 A1    Nov. 3, 2016

(30) Foreign Application Priority Data

Dec. 20, 2013  (DE) .................. 10 2013 226 862
Dec. 20, 2013  (DE) .................. 10 2013 226 865
May 23, 2014   (DE) .................. 10 2014 209 845

(51) Int. Cl.
*B60N 2/70*   (2006.01)
*B60N 2/56*   (2006.01)
(Continued)

(52) U.S. Cl.
CPC ........ *B60N 2/5664* (2013.01); *B29C 44/0476* (2013.01); *B29C 44/06* (2013.01); *B60N 2/42718* (2013.01); *B60N 2/70* (2013.01); *B60N 2/7017* (2013.01); *B60N 2/90* (2018.02); *B29K 2075/00* (2013.01); *B29K 2105/04* (2013.01); *B29L 2031/58* (2013.01); *B29L 2031/771* (2013.01)

(58) Field of Classification Search
CPC .......... B29L 2031/58; B29L 2031/771; B60N 2/7017; B60N 2/70
See application file for complete search history.

(56) References Cited

U.S. PATENT DOCUMENTS 2,588,823 A    3/1952  Glassman
3,298,046 A    1/1967  Clementi et al.
(Continued)

FOREIGN PATENT DOCUMENTS

DE    19 08 883 U    1/1965
DE    298 09 933 U1  8/1998
(Continued)

*Primary Examiner* — Timothy J Brindley
(74) *Attorney, Agent, or Firm* — McGlew and Tuttle, P.C.

(57) ABSTRACT

A foam part (5, 105, 205, 305), in particular for a vehicle seat, includes several comfort tubes (50, 150, 250, 350) facing a user. Several of the comfort tubes (50, 150, 250, 350) respectively comprise a hole (55, 155, 255, 355, 60, 160, 260, 360) or several holes (55, 155, 255, 355, 60, 160, 260, 360). At least one of the holes (55, 155, 255, 355, 60, 160, 260, 360) is embodied as a blind hole (60, 160, 260, 360).

20 Claims, 6 Drawing Sheets

(51) Int. Cl.
  *B60N 2/90* (2018.01)
  *B29C 44/04* (2006.01)
  *B29C 44/06* (2006.01)
  *B60N 2/427* (2006.01)
  *B29L 31/58* (2006.01)
  *B29K 75/00* (2006.01)
  *B29K 105/04* (2006.01)
  *B29L 31/00* (2006.01)

(56) References Cited

U.S. PATENT DOCUMENTS

| | | | | |
|---|---|---|---|---|
| 4,524,473 | A * | 6/1985 | Fanti | A47C 27/15 |
| | | | | 5/724 |
| 5,430,901 | A * | 7/1995 | Farley | A47C 27/144 |
| | | | | 156/252 |
| 5,816,661 | A | 10/1998 | Sakurai et al. | |
| 5,850,648 | A | 12/1998 | Morson | |
| 6,546,578 | B1 * | 4/2003 | Steinmeier | B60N 2/7035 |
| | | | | 297/452.46 |
| 8,491,057 | B2 * | 7/2013 | Demontis | B60N 2/5664 |
| | | | | 297/180.13 |
| 8,821,777 | B2 * | 9/2014 | San Miguel | A47C 7/18 |
| | | | | 264/225 |
| 9,032,571 | B2 * | 5/2015 | Rancourt | A47C 23/002 |
| | | | | 5/652 |
| 9,706,851 | B2 * | 7/2017 | Malkiewicz | A47C 27/20 |
| 9,738,192 | B2 * | 8/2017 | Hirata | B60N 2/01508 |
| 2008/0290716 | A1 * | 11/2008 | Ekornes | A47C 27/146 |
| | | | | 297/452.48 |
| 2010/0005594 | A1 | 1/2010 | Rancourt et al. | |
| 2010/0314929 | A1 | 12/2010 | Hsu | |

FOREIGN PATENT DOCUMENTS

| | | |
|---|---|---|
| DE | 202 02 042 U1 | 6/2002 |
| DE | 20 2007 002 196 U1 | 5/2007 |
| EP | 1 068 094 B1 | 8/2002 |
| GB | 2 441 417 A | 3/2008 |
| WO | 2007/128113 A1 | 11/2007 |
| WO | 2010/102785 A2 | 9/2010 |
| WO | 01/74557 A1 | 10/2011 |
| WO | 2014/106592 A1 | 7/2014 |

* cited by examiner

FOAM PART, IN PARTICULAR FOR A VEHICLE SEAT, AND VEHICLE SEAT

CROSS REFERENCE TO RELATED APPLICATIONS

This application is a United States National Phase Application of International Application PCT/EP2014/077742 filed Dec. 15, 2014 and claims the benefit of priority under 35 U.S.C. § 119 of German Patent Applications 10 2013 226 865.3 filed Dec. 20, 2013, 10 2013 226 862.9 filed Dec. 20, 2013 and 10 2014 209 845.9 filed May 23, 2014 the entire contents of which are incorporated herein by reference.

FIELD OF THE INVENTION

The invention relates to a foam part, in particular for a vehicle seat, comprising a plurality of comfort tubes facing a user, wherein a plurality of comfort tubes respectively comprise a hole or a plurality of holes. The invention further relates to a vehicle seat comprising such a foam part.

BACKGROUND OF THE INVENTION

Foam parts for vehicle seats are known in practice, said foam parts serving for padding the seat structure and being intended to provide the user of the vehicle seat with the highest possible level of seating comfort. Generally, the seat padding comprises a foam part for the seat cushion and a foam part separate therefrom for the seat backrest. Each of the two foam parts has a central region and two side cheeks. In a foam part for the seat cushion, the central region of the foam part supports the buttocks and the rear of the thighs of the occupant of the vehicle seat on the underside, whilst the two seat cheeks laterally bear against one respective thigh and, as a result, are able to absorb transverse forces on the occupant, in particular during cornering. In a foam part for the backrest, the central region of the foam part supports the back of the occupant at the rear, whilst the two side cheeks laterally bear against the back and, as a result, are able to absorb transverse forces on the occupant.

A foam part, in particular for a vehicle seat, comprising a first foam layer facing a user and a second foam layer remote from the user is disclosed in DE 202 02 042 U1, wherein the first foam layer has a hardness and/or density which is different relative to the second foam layer. The foam part has a plurality of holes in the central seat surface.

DE 20 2007 002 196 U1 discloses a foam part, in particular for a vehicle seat, having a first foam layer facing a user and a second foam layer remote from the user and an intermediate layer arranged between the foam layers. The foam part has a system of holes for improving the properties of conveying moisture.

EP 1 068 094 B1 discloses a foam part comprising, in order to increase the level of comfort, a plurality of comfort tubes which are integrally formed on a base body of the foam part and which are adjacent to one another, said comfort tubes extending upwardly away from the base body, substantially perpendicular to the seat surface, and being denoted as tubular portions. When the occupant sits down, initially the comfort tubes are compressed, whilst the base body is only slightly deformed. The base body is further compressed only after considerable deformation of the comfort tubes. As a result, a two-stage seating characteristic with increasing cushion hardness is achieved. The comfort tubes have holes extending fully through the foam part.

A foam part comprising a plurality of blind holes is disclosed in U.S. Pat. No. 5,816,661 A, said blind holes extending from a substantially planar foam partial surface into the foam part in a direction substantially perpendicular relative to the foam part surface.

Two-zone foams are known from the prior art, wherein by using different foam materials the central region is configured to be softer than the side cheeks. As a result, firstly the seating comfort is intended to be enhanced and secondly the side support for the user is intended to be improved. To this end, cut foam layers are often used in the central region and hard foam inserts are often used in the side cheeks. To prevent the user from falling down through the lap belt in the event of a crash, frequently an anti-submarining function is provided by an additional component made of a particle foam material, for example EEP (expanded polypropylene). The aforementioned additional components increase the costs and reduce the durability of the foam parts. Additionally, thin foam thicknesses are only possible to a limited extent.

A foam part is disclosed in WO 01/74557 A1, comprising a first region made of foam having a first composition and a second region made of foam having a second composition, wherein between the first and the second region a network of polyethylene, jute, gauze, non-woven fabric or the like is arranged. This foam part, however, does not fulfill the highest comfort requirements when the occupant sits down, in particular not when a very soft cushion layer is initially desired when the occupant sits down. A comparable cushion structure is also disclosed in WO 2010/102785 A2.

A combination of tubular portions as disclosed in EP 1 068 094 B1 and a horizontal separating plane between a first region of the foam part having a first composition and a second region of the foam part having a second composition as disclosed in WO 01/74557 A1 was not regarded hitherto as being able to be produced.

SUMMARY OF THE INVENTION

An object of the invention is to improve a foam part of the type mentioned in the introduction. In particular, the seating comfort of the occupant is intended to be increased. In particular, the flexibility of the cushion surface is intended to be able to be adapted in a targeted manner, for example the effect of a seat structure arranged below the foam part on the flexibility of the foam part is intended to be able to be compensated, and a targeted air distribution for seat air-conditioning permitted. Additionally, a vehicle seat comprising such a foam part is intended to be provided.

According to the invention, a foam part, in particular for a vehicle seat, is provided comprising a plurality of comfort tubes facing a user, wherein a plurality of comfort tubes respectively comprise a hole or a plurality of holes. At least one of the holes in the comfort tubes is configured as a blind hole. The design of the foam part provides an optimization of the seating comfort with regard to the hardness of the foam part and the seat ventilation.

In the design of foam parts, an optimization of the seating comfort with regard to the hardness of the foam part and an optimization of the seat ventilation often represent contradictory goals. This conflict of goals may be avoided by individual holes of the comfort tubes being configured as blind holes, i.e. not extending fully through the foam part. The blind holes namely do not provide any air circulation through the foam part, but a comfort tube with blind hole in comparison with a comfort tube with a through-hole has a lower degree of flexibility.

The term "comfort tube" is understood as a raised foam part region facing the occupant which may have a very different geometry. In the cushion regions facing the occupant the comfort tubes form substantially free-standing, in particular completely free-standing, raised portions relative to a base body of the foam part. The comfort tubes are completely or substantially surrounded by a recess. The recess may be approximately 5 mm to 50 mm deep, preferably 10 mm to 25 mm deep and preferably at most 15 mm to 20 mm deep. The depth of the recess corresponds to the height of the adjacent comfort tube.

The comfort tubes may be configured to be hollow on the inside, for example for the purposes of seat air-conditioning, or consist of solid material. In the case of comfort tubes configured to be hollow on the inside, through-holes or blind holes may extend through the comfort tubes and a base body of the foam part bearing the comfort tubes. In this case a comfort tube may have no holes, or one or more, in particular two, holes offset relative to one another, in particular extending parallel to one another.

The through-holes which are not configured as blind holes extend fully through the foam part, so that air is able to flow from the lower face of the foam part through the holes to the upper face of the foam part and vice-versa.

Preferably, the holes (through-holes and blind holes) are of cylindrical, in particular of circular-cylindrical configuration. As a result, the holes may be produced by simple means. However, according to the invention any other cross sections of the holes are possible.

The flexibility of an individual comfort tube may also be specifically influenced by the provision of a plurality of holes and/or a combination of blind holes and through-holes. Preferably, comfort tubes with a plurality of holes are arranged in the region of the seat center, viewed in the transverse direction of the vehicle.

The outer contours of the cross sections of the comfort tubes may, in principle, have any known cross section of solid bodies, and in particular may be designed to be round, polygonal, honeycombed or as disclosed in EP 1 068 094 B1. The outer contours of the comfort tubes are independent of the cross sections of the holes so that, for example, a square comfort tube may have an oval hole.

At least one comfort tube may have just one blind hole. Preferably, a plurality of comfort tubes may have just one blind hole. A comfort tube may also have a plurality of blind holes. This is expedient when the dimension of the comfort tube, in at least one direction extending perpendicular to the blind hole, is many times larger than the diameter of the blind hole. At least one comfort tube may have a blind hole and a through-hole. This is expedient if an asymmetrical characteristic of the flexibility of a comfort tube is desired.

A blind hole preferably passes from a surface of the foam part facing an occupant. A blind hole, however, may also pass from a surface of the foam part remote from an occupant. A blind hole preferably extends approximately in the direction perpendicular to the surface of the foam part. A blind hole preferably extends parallel to a closing direction of a tool comprising a lower part and an upper part, for producing the foam part. The lower part and the upper part form a cavity of the tool in which the foam part is foamed. By means of blind holes extending parallel to the closing direction, the foam part may be removed more easily from a tool. The closing direction is the direction in which the upper part moves relative to the lower part, when opening and closing the tool. Due to a three-dimensional surface of the foam part, a blind hole may extend differently from a direction exactly perpendicular to the surface of the foam part, which is described by the feature "approximately perpendicular". By the feature "approximately perpendicular" is to be understood that the path of the blind hole extends parallel to the closing direction of the tool and/or perpendicular to a surface of the foam part and/or perpendicular to a partial surface of the foam part and/or perpendicular to a surface of the comfort tube. "Approximately perpendicular" encompasses angular deviations of up to 15° from one of the cited perpendicular lines or the closing direction. A partial surface of the foam part in this case may, for example, be the surface of a central region of a seat surface. A blind hole may extend in the direction perpendicular or approximately perpendicular to the surface of a comfort tube oriented toward the occupant. A blind hole may extend in the direction perpendicular or approximately perpendicular to a compensating plane of a surface oriented toward the occupant of a comfort tube or a partial region.

The depth of a blind hole may correspond to the height of the associated comfort tube. The depth of the blind hole may, however, also be less than the height of the associated comfort tube or greater than the height of the associated comfort tube. "Associated comfort tube" is to be understood as the comfort tube in which the blind hole at least partially extends. A blind hole may be approximately 5 mm to 100 mm deep, preferably 20 mm to 80 mm deep and preferably at most 40 mm to 60 mm deep. A plurality of blind holes of a foam part may have different depths relative to one another.

A further increase in comfort may be achieved by the foam part comprising the blind holes consisting of a first foam layer and a second foam layer.

An exact separation of the foam part regions between the first foam layer and the second foam layer may be achieved by a planar network between the foam layers, in particular a network of polyethylene, jute, gauze or non-woven fabric. Ideally, during the foaming method the network is able to be permeated by the foam material to a small extent, whereby a fixed connection is produced between the foam layers and the network. The term "network" is understood as all textile materials, woven fabrics, knitted fabrics and non-woven fabrics, known per se.

The network of a comfortably designed foam part is preferably located between the first foam layer and the second foam layer in an approximately horizontal, preferably exactly horizontal, plane of the foam part. The term "horizontal" in this case does not mean the mathematically exact horizontal layer inside a vehicle but all planes which are approximately parallel to the surface of the respective foam part facing the seat occupant. The seat backrest cushions may, therefore, have a horizontal plane which may even be aligned approximately vertically in the vehicle. In the tool, however, the horizontal plane is generally located approximately horizontally. The horizontal plane in this case does not have to be mathematically planar, i.e. two-dimensional, but may also have a slightly three-dimensional shape with bulged portions and slight raised portions and recesses.

If the network is arranged in a region of the lowermost points of recesses between at least two comfort tubes, when the occupant sits down initially the comfort tubes are substantially compressed. When the occupant sits down further, the second foam layer is also markedly compressed. As a result, a two-stage seating characteristic is achieved with increasing cushion hardness.

A three-stage seating characteristic with increasing cushion hardness is achieved by the network being arranged in a region considerably below the recesses between the at least two comfort tubes. The separating plane between the two foam layers in comparison with the above-described variant with a two-stage seating characteristic is deeper, i.e. removed further from the occupant. As a result, when the occupant sits down initially the comfort tubes are substantially compressed. When the occupant sits down further, the layer arranged below the comfort tubes of the first foam layer is substantially compressed, initially without markedly compressing the second foam layer. Finally, the second foam layer is also markedly compressed.

Alternatively, a three-stage seating characteristic may also be achieved by the network being arranged in a region above the lowermost points of the recesses between at least two comfort tubes.

A preferred cover fastening to a foam part according to the invention provides that cushion fastening channels are provided between individual areas of comfort tubes, the cover being able to be fastened thereby to fastening means in the foam part, preferably via clips, wires or hooks. Such fastening means may be metal wires enclosed in foam in a manner known per se.

A uniform seat pressure distribution is achieved if the comfort tubes of individual mirror-symmetrically arranged areas are arranged mirror-symmetrically. Particularly preferably, in this case, a mirror plane of symmetry extends through a cushion fastening channel which extends in the direction of travel and in the seat center. The arrangement of blind holes and through-holes may be mirror-symmetrical but in individual cases asymmetrical arrangements may also be advantageous, for example if the seat cushion structure to be cushioned is itself of asymmetrical construction.

A foam part provides a particularly good lateral support for a seat occupant by the foam part having a third foam layer which has a greater hardness and/or density relative to the hardness and/or density of the two other foam layers, in particular in the region of a side cheek of the foam part.

The object is also achieved by a vehicle seat having a backrest and a seat cushion, wherein the backrest and/or the seat cushion comprises a foam part according to the invention. A vehicle seat having a backrest and a seat cushion may be considerably improved with regard to the seating comfort, by the backrest and/or the seat cushion having a foam part according to the invention. The seating comfort of a vehicle seat may be increased by a row of comfort tubes of a foam part of the seat cushion furthest to the front in the direction of travel comprising at least one blind hole. Preferably all of the comfort tubes of a row of comfort tubes of a foam part of the seat cushion furthest to the front have just one blind hole.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
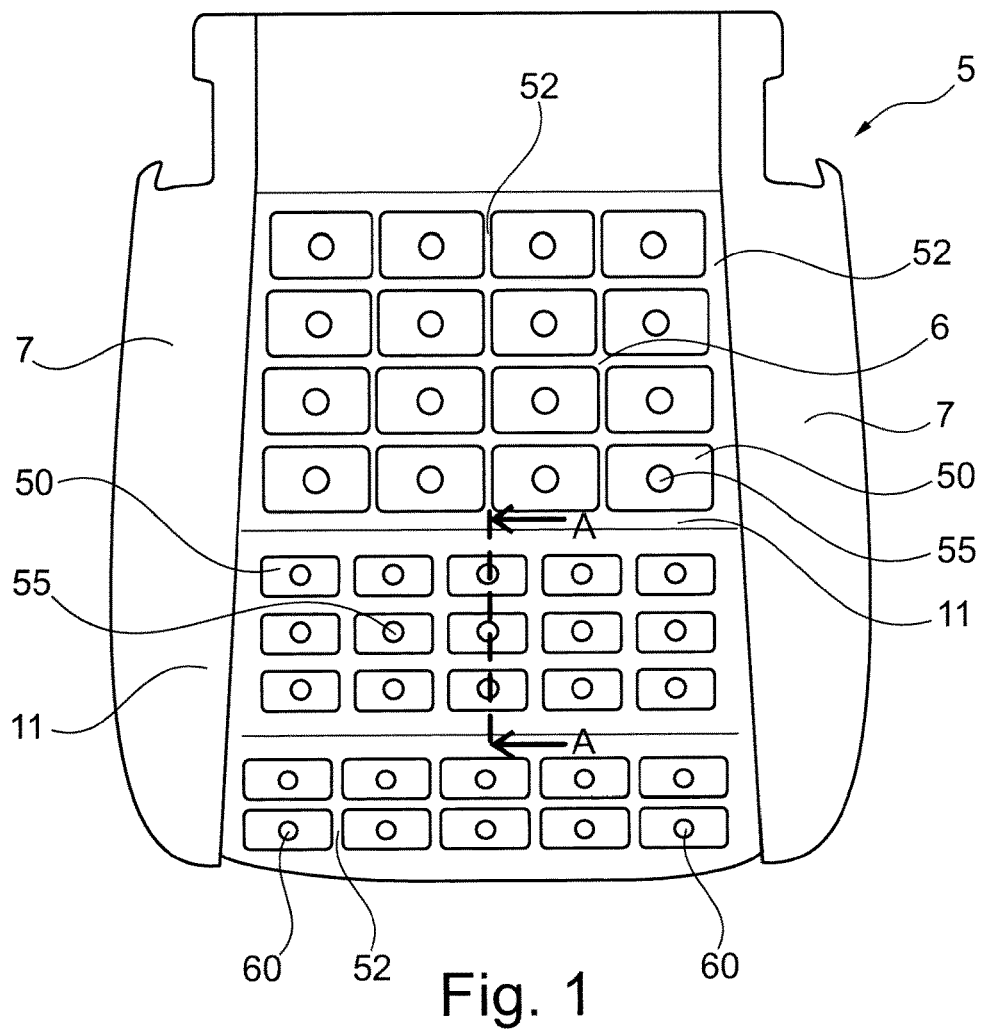
FIG. 1 is a plan view of a first exemplary embodiment designed as a seat cushion foam part.

Referring to the drawings, a vehicle seat, in particular for a motor vehicle, comprises a seat cushion and a backrest.

Figure 2:
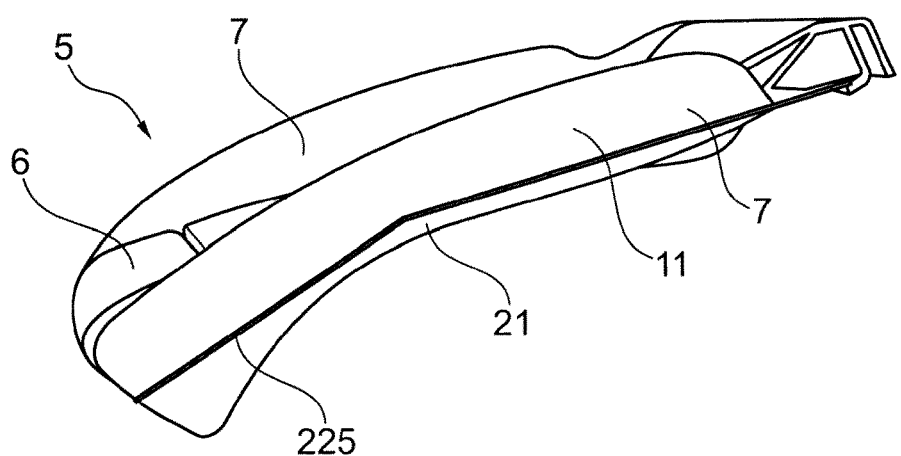
FIG. 2 is a side view of the first exemplary embodiment.

A foam part 5 according to the invention for the seat cushion of the vehicle seat is shown in FIGS. 1 and 2 as a first exemplary embodiment. The foam part 5 comprises a central region 6 and two side cheeks 7.

A first foam layer 11 arranged approximately horizontally in the installed position of the vehicle seat in the case of use of the vehicle seat faces the user, so that the user with the buttocks and the rear of the thighs is in contact in partial regions with the first foam layer 11, optionally by the interposition of further cushioned components, such as in particular a fabric or leather cover. The first foam layer 11 preferably consists of soft foam.

In the installed position a second foam layer 21 is arranged below the first foam layer 11, in particular also approximately horizontally aligned, and connected in one piece to the first foam layer 11. The second foam layer 21 consists of a more solid foam material, preferably of hard foam, relative to the foam material of the first foam layer 11.

In a modification of the first exemplary embodiment, the side cheeks 7 consist of a third foam material. The second foam layer 21 consists of a harder foam material relative to the foam material of the first foam layer 11. The third foam material of the side cheeks 7 is even harder than the foam material of the second foam layer 21.

A separating plane between the first foam layer 11 and the second foam layer 21 extends in the present case both through the central region 6 and through the two side cheeks 7. In modifications of the exemplary embodiment, however, the side cheeks 7 may also entirely consist of the second foam layer 21 or of a third foam material. In this case, only the central region 6 has a two-zone foam.

The two foam layers 11, 21 are foamed in a tool and have different levels of hardness and density relative to one another. The two foam layers 11 and 21 are produced from polyurethane and, in particular, in MDI (methylene diphenyl diisocyanate) or TDI (toluene diisocyanate) foaming methods or a mixed method. The foam hardness is preferably between 4 and 20 kPa, wherein the first foam layer 11 is closer to the lower value and the second foam layer 21 is closer to the upper value. The density of the foam layers 11, 21 is preferably between 50 g/l and 95 g/l.

The central region 6 of the first foam layer 11 additionally has a plurality of comfort tubes 50, in the present case forty one, which are designed, in particular, with a rectangular cross section and increase the comfort when the occupant first sits down and on short journeys. The lower, harder second foam layer 21, however, increases the long-term comfort. "Comfort tube" 50 is understood as a raised point of the surface of the foam part 5 which faces the seat occupant and which is surrounded by at least one recess 52. The recess 52 is approximately 5 mm to 50 mm deep, preferably 10 mm to 25 mm deep and preferably at most 15 mm to 20 mm deep. A comfort tube 50 is thus an at least partially freestanding region of the surface of the foam part 5. A comfort tube may consist of solid material or may be designed to be partially hollow on the inside.

The comfort tubes 50 are integrally configured or connected to the first foam layer 11 and form the portions of the central region 6 of the foam part 5 facing closest to the seat occupant. The comfort tubes 50 are arranged substantially perpendicular to the seat surface. The cross sections of the comfort tubes 50 in the present case are rectangular with rounded edges but may also have any other geometric shape. The recesses 52 are located between adjacent comfort tubes 50, the depth of said recesses corresponding to the height of the respective comfort tubes 50 over a bottom surface of the first foam layer 11.

For effective air-conditioning comfort, in each case a through-hole 55 is provided in some of the comfort tubes 50. In the present case the through-holes 55 are configured to be circular-cylindrical and preferably are located centrally in the associated comfort tube 50. Cross sections of the through-holes 55 deviating from a circular-cylindrical shape, for example polygonal cross sections or elliptical cross sections, are also possible. Each of the through-holes 55 extends entirely through the foam part 5 so that air is able to flow through the through-hole 55. The through-holes 55 extend substantially perpendicular to the surface of the central region 6.

Some of the comfort tubes 50 have one respective blind hole 60. In the present case, the blind holes 60 are configured to be circular-cylindrical and are preferably located centrally in the associated comfort tube 50. Cross sections of the blind holes 60 deviating from a circular-cylindrical shape, for example polygonal cross sections or elliptical cross sections, are also possible. Each of the blind holes 60 extends into the foam part 5, starting from a surface of the foam part 5, without passing fully through the foam part 5. The surface may be the surface of the foam part 5 facing the seat occupant, which is also denoted as the A-side. The surface may also be the lower face of the foam part 5 remote from the seat occupant, however, which is also denoted as the B side. Each of the blind holes 60 is only open on one side, therefore, so that no air is able to flow through the blind hole 60. The blind holes 60 extend substantially perpendicular to the surface of the central region 6.

The depth of a blind hole 60 in a comfort tube 50 influences the flexibility of this comfort tube 50. The depth of a blind hole 60 in a comfort tube 50 may be smaller, the same or larger than the height of the comfort tube 50.

The seating comfort and the seat air-conditioning may be influenced in a targeted manner by means of the depth of the blind holes 60 and/or a combination of blind holes 60 and through-holes 55 inside a foam part 5.

The through-holes 55 permit an effective exchange of air and moisture through the foam part 5 and namely advantageously also without active ventilation means such as fans. Thus it is a purely passive air-conditioning system.

A network configured as non-woven fabric 225 is located between the two foam layers 11 and 21, said network representing a boundary between the two foam layers 11 and 21. The two foam layers 11 and 21 are in each case connected by a material connection or a positive connection to the non-woven fabric 225.

The non-woven fabric 225 is preferably aligned perpendicular to the through-holes 55 and the blind holes 60. In the present case, the non-woven fabric 225 is configured to be planar and without holes, so that the non-woven fabric 225 passes through the holes 55. The non-woven fabric 225, however, may also be configured to be perforated in the region of the holes 55.

Figure 3:
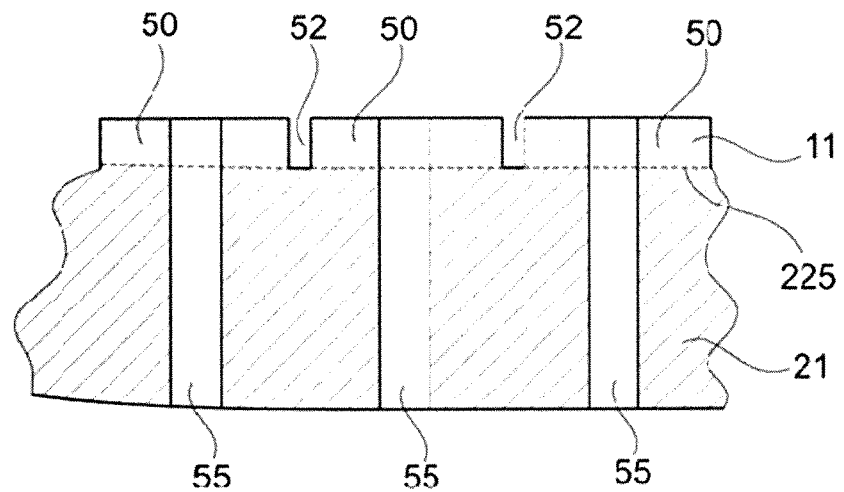
FIG. 3 is a sectional view through the first exemplary embodiment along the line A-A in FIG. 1.

FIG. 3 shows a section through the foam part 5. The non-woven fabric 225 directly adjoins the recesses 52 between the individual comfort tubes 50, so that the comfort tubes 50 exclusively form the first foam layer 11. When the occupant sits down, initially the comfort tubes 50 are substantially compressed. When the occupant sits down further, the second foam layer 21 is also markedly compressed. As a result, a two-stage seating characteristic with increasing cushion hardness is achieved. The section in FIG. 3 shows exclusively the through-holes 55. However, blind holes 60 are also provided in other comfort tubes 50 of the foam part 5. The distribution of the comfort tubes 50 which have blind holes 60 over the central region 6 is possible in many different ways. The depth of a blind hole 60 may correspond to the depth of the recesses 52 surrounding the comfort tube 50 and thus the height of the comfort tubes 50. A base of the blind hole 60 thus coincides with the non-woven fabric 225. The depth of the blind holes 60, however, may be smaller or larger. In the latter case, the non-woven fabric 225 may be correspondingly perforated.

Figure 4:
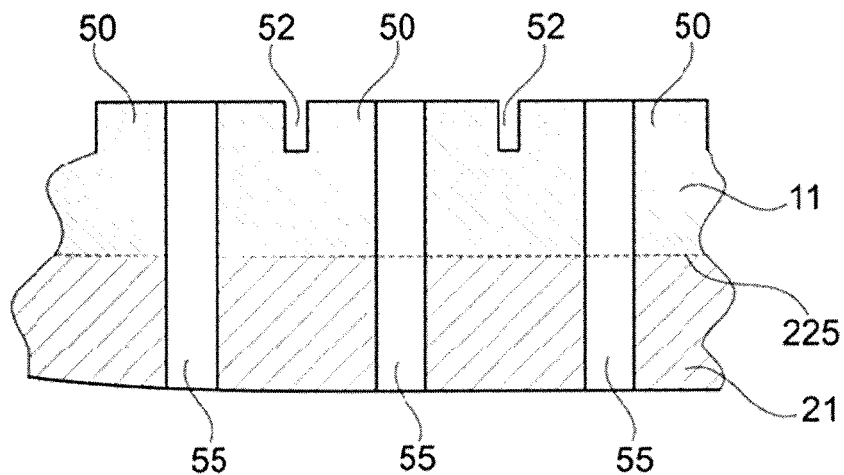
FIG. 4 is a sectional view corresponding to FIG. 3 through a first modification of the first exemplary embodiment.

In FIG. 4, a first modification of the first exemplary embodiment is shown. In comparison with the first exemplary embodiment, the non-woven fabric 225 is arranged more deeply so that the separating plane between the two foam layers 11 and 21 is deeper, i.e. further away from the occupant. When the occupant sits down, initially the comfort tubes 50 are substantially compressed. When the occupant sits down further, substantially the layer of the first foam layer 11 arranged below the comfort tubes 50 is markedly compressed, until finally the second foam layer 21 is also markedly compressed. As a result, a three-stage seating characteristic with increasing cushion hardness is achieved. The section in FIG. 4 shows exclusively the through-holes 55. However, blind holes 60 may also be provided in other comfort tubes 50 of the foam part 5. The distribution of the comfort tubes 50, which have blind holes 60, over the central region 6 is possible in many different ways.

Figure 5:
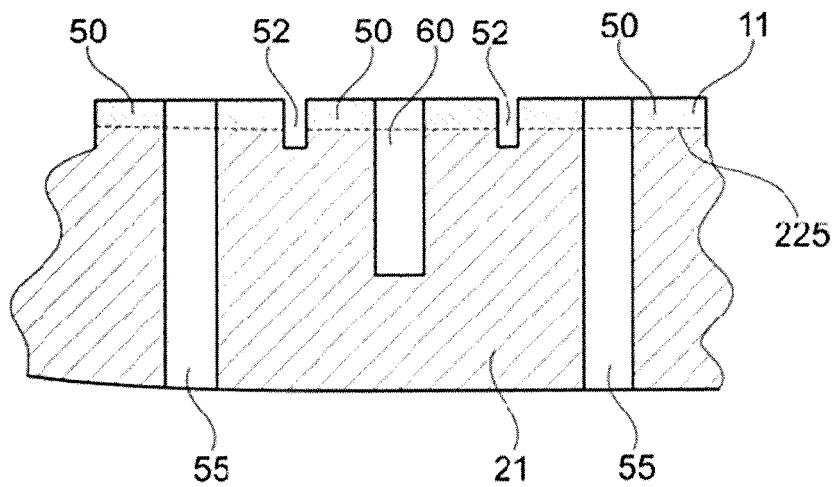
FIG. 5 is a sectional view corresponding to FIG. 3 through a second modification of the first exemplary embodiment.

In FIG. 5, a second modification of the first exemplary embodiment is shown. The non-woven fabric 225 is arranged higher in comparison with the first exemplary embodiment, so that the separation between the two foam layers 11 and 21 is located inside the comfort tubes 50, i.e. is closer to the occupant. When the occupant sits down, initially the upper regions of the comfort tubes 50 which belong to the first foam layer 11 are substantially compressed. When the occupant sits down further, the lower regions of the comfort tubes 50 which belong to the second foam layer 21 are also markedly compressed and finally also the regions of the second foam layer 21 located below the comfort tubes 50. As a result, a three-stage seating characteristic is achieved with increasing cushion hardness. The section in FIG. 5 shows a comfort tube 50 with a blind hole 60 surrounded by two comfort tubes 50 with in each case a through-hole 55. The distribution of the comfort tubes 50 with blind holes 60 over the central region 6 is possible in many different ways.

Figure 6:
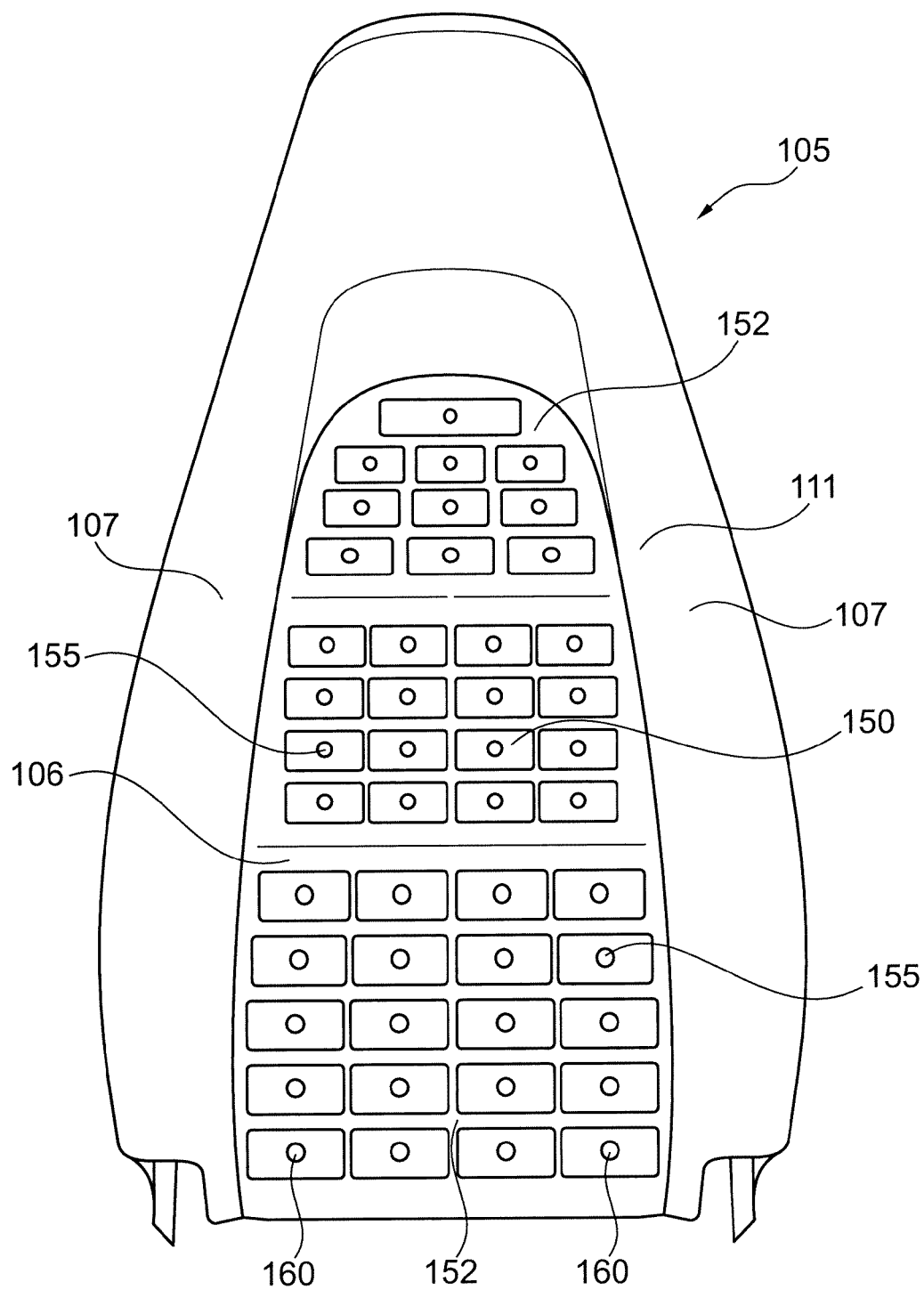
FIG. 6 is a front view of a second exemplary embodiment designed as a seat backrest foam part.
Figure 7:
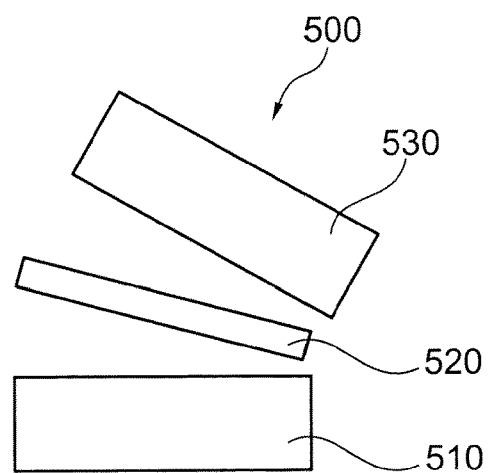
FIG. 7 is a basic sketch of a tool according to the invention.
Figure 8:
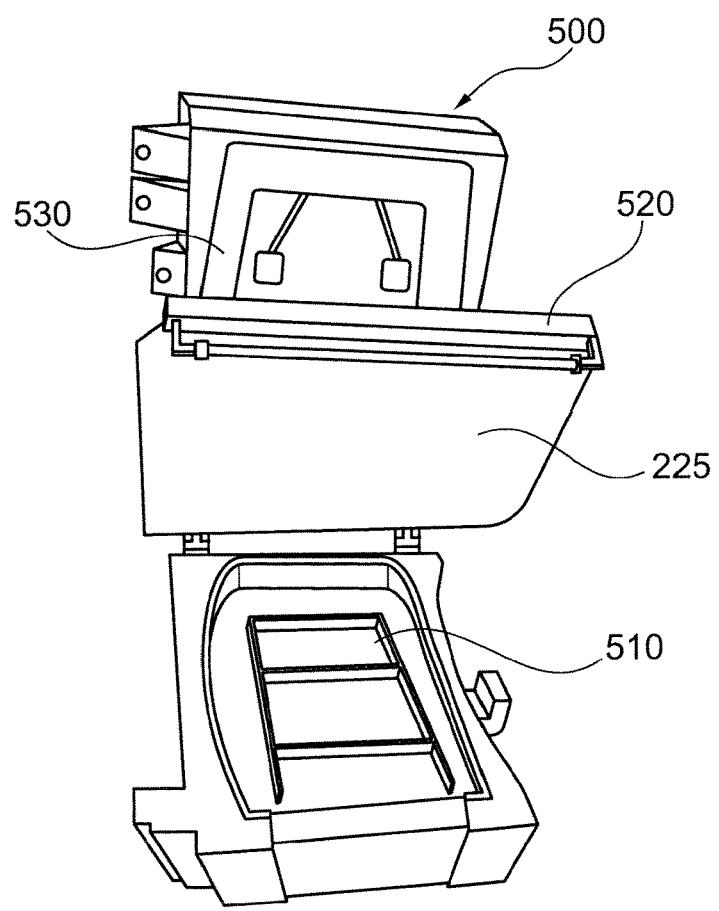
FIG. 8 is a schematic perspective view of the tool of FIG. 7.

A second exemplary embodiment, shown in FIG. 6, is designed as a foam part 105 for a seat backrest. The foam part 105 comprises a central region 106 and two side cheeks 107. The foam part 5 of the first exemplary embodiment and the foam part 105 enclose an angle of, for example, approximately 90 degrees in the installed state and in the state of use. A first foam layer 111 of the foam part 105 in the vehicle is oriented approximately vertically and to the front in the direction of travel so that the back of the user is in contact in partial regions with the first foam layer 111, optionally by the interposition of further cushion components, such as in particular a fabric or leather cover.

In the installed position behind the first foam layer 111 a second foam layer, not visible in FIG. 6, is arranged, in particular also aligned, approximately vertically and, in particular, connected in one piece to the first foam layer 111. The second foam layer preferably consists of hard foam. The first foam layer 111 and the second foam layer are foamed in a tool and have different levels of hardness and density to one another.

The first foam layer 111 additionally has a plurality of comfort tubes 150 which increase the comfort when the occupant first sits down and on short journeys. The lower, harder second foam layer, however, increases the long-term comfort.

Recesses 152 are located between adjacent comfort tubes 150, the depth of said recesses corresponding to the height of the respective comfort tubes 150 over a bottom surface of the first foam layer 111.

For effective air-conditioned comfort, a through-hole 155 is provided in some of the comfort tubes 150, said through-hole extending fully through the foam part 105. The remaining comfort tubes 150 in each case comprise just one blind hole 160. The distribution of comfort tubes 150 with blind holes 160 over the central region 106 is possible in many different ways.

The first foam layer 111 and the second foam layer are preferably produced in MDI (methylene diphenyl diisocyanate) or TDI (toluene diisocyanate) foaming methods. The foam hardening is located in typical regions known per se.

In a modification of the second exemplary embodiment, the foam part 105 comprises a first foam layer 111 but no further foam layer, in particular no second foam layer. This construction is preferably selected when a very low foam thickness of the foam part 105 is intended to be achieved or a simple tool construction is intended to be produced.

The production of the foam parts 5 and 105 according to the invention takes place in a tool 500. The tool 500 comprises a bowl-like lower part 510, a frame 520 which is pivotable relative to the lower part 510 and which tensions a non-woven fabric 225 as an intermediate insert, and a cover-like upper part 530 which is pivotable relative to the frame 520. The tool contours for producing the comfort tubes 50 and 150 are provided in the lower part 510, so that the foam part 5 is produced upside down relative to its installed position in the vehicle.

In a first foaming method, the material for the first foam layer 11, 111 is filled into the lower part 510. Subsequently, the frame 520 together with the tensioned non-woven fabric 225 is pivoted onto the lower part 510 so that the non-woven fabric 225 bears against the surface of the second foam layer 21, 221. In a second foaming process, the material for the second foam layer 21 is introduced into the space between the frame 520 and the upper part 530 and the upper part 530 is subsequently closed.

Figure 9:
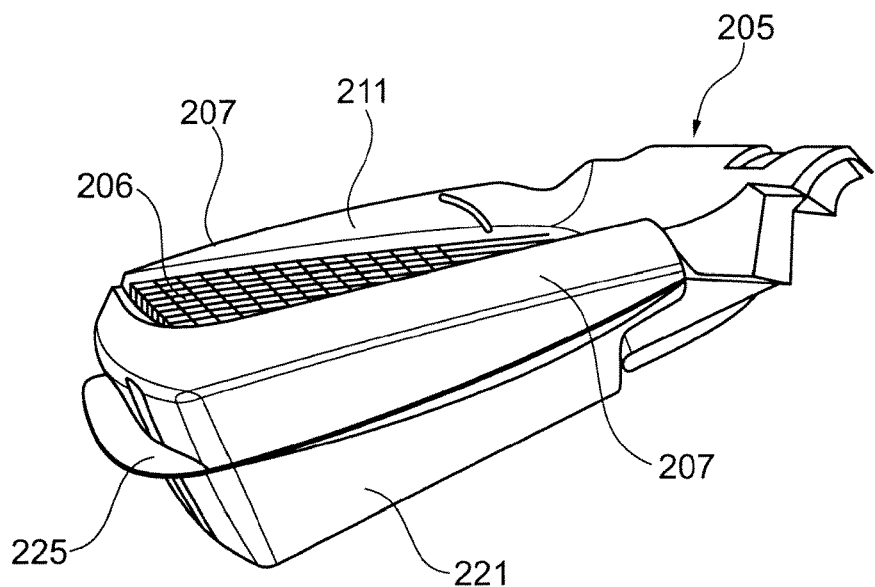
FIG. 9 is a perspective view of a third exemplary embodiment designed as a seat cushion foam part.
Figure 10:
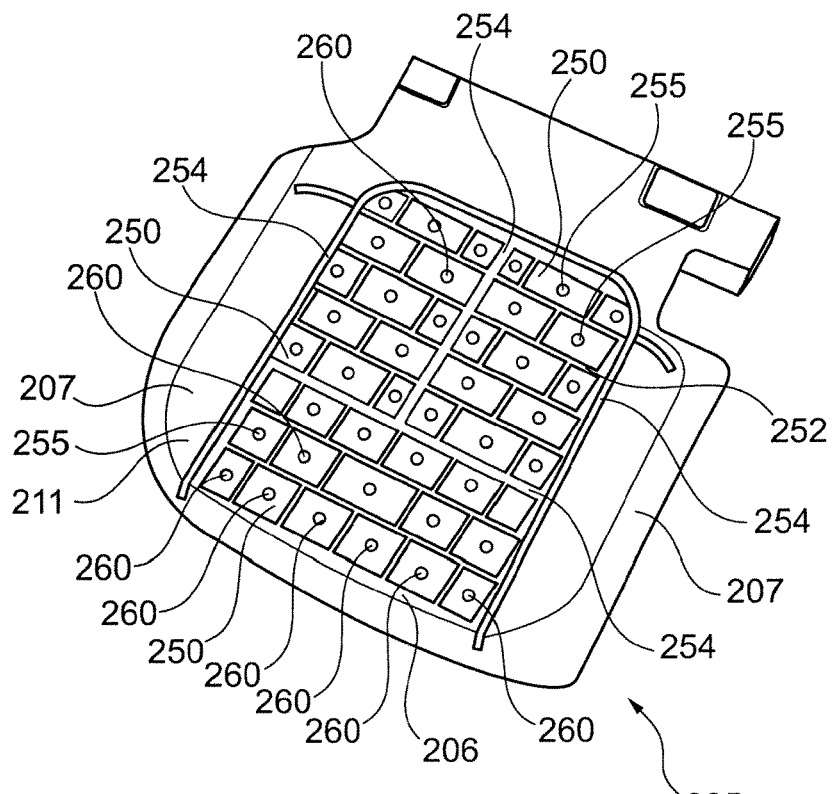
FIG. 10 is a plan view of the third exemplary embodiment.

A third exemplary embodiment shown in FIGS. 9 and 10 substantially corresponds to the first exemplary embodiment, to the extent that it is not described differently hereinafter. Similar-acting components and contours have reference numerals increased by the value 200 relative to the first exemplary embodiment. A production method and a tool for the third exemplary embodiment also substantially correspond in each case to the production method and tool described above.

The third exemplary embodiment is a foam part 205 for a seat cushion of the vehicle seat. The foam part 205 comprises a central region 206 and two side cheeks 207.

A first foam layer 211 arranged approximately horizontally in the installed position of the vehicle seat faces the user in the case of use of the vehicle seat. The first foam layer 211 preferably consists of soft foam.

In the installed position a second foam layer 221 is arranged below the first foam layer 211, in particular also approximately horizontally aligned, and connected in one piece to the first foam layer 211. The second foam layer 221 consists of a more solid foam material relative to the foam material of the first foam layer 211, preferably of hard foam.

The two foam layers 211 and 221 are foamed in a tool and have different levels of hardness and density relative to one another.

The first foam layer 211 additionally has a plurality of comfort tubes 250, in the present case forty-three, which have a substantially rectangular cross section. Some of these comfort tubes 250 have an approximately square cross section. Recesses 252 are located between adjacent comfort tubes 250, the depth of said recesses corresponding to the height of the respective comfort tubes 250 over a bottom surface of the first foam layer 211.

The comfort tubes 250 are divided into three areas of directly adjacent comfort tubes 250. The boundaries of the areas are formed by cushion fastening channels 254. The cushion fastening channels 254 provide a plurality of through-holes for first fastening means fastened to a seat cover and second fastening means cooperating with these first fastening means and introduced into the foam part 205. The fastening means known per se, such as for example wires and hooks, are not shown in the Figures.

In the present case, seventeen comfort tubes 250 are distributed over the entire width of the central region 206 in a front area of comfort tubes 250 positioned below the thighs of an occupant, i.e. in the front region of the central region 206 of the foam part 205. In the present case, thirteen comfort tubes 250 are respectively distributed in two further rear areas of comfort tubes 250, respectively positioned in a region below the ischial bones of the occupant. In the transverse direction each of the two areas is located between one respective cushion fastening channel 254 in the seat center and one respective cushion fastening channel 254 adjacent to one of the two side cheeks 207. The distribution and the shape of the comfort tubes 250 in the two areas are mirror-symmetrical to one another.

The comfort tubes 250 are integrally connected to the first foam layer 211 and form the portions of the central region 206 of the foam part 205 facing closest to the seat occupant. The comfort tubes 250 are arranged substantially perpendicular to the seat surface. The cross sections of the comfort tubes 250 in the present case are rectangular with rounded edges, but may also have any other geometric shape.

For effective air-conditioning comfort, one respective through-hole 255 is provided in some of the comfort tubes 250, said through-hole extending entirely through the foam part 205. Other comfort tubes 250 in each case have just one blind hole 260. The distribution of the comfort tubes 250 which have blind holes 260 is possible in any manner over the central region 206. Individual comfort tubes 250, in the present case arranged adjacent to the side cheeks 207, are formed from solid material and thus have neither a through-hole 255 nor a blind hole 260. In the present case, in a front row of comfort tubes 250, viewed in the direction of travel, all of the comfort tubes 250 are provided with one respective blind hole 260. In a second row of comfort tubes 250 which is immediately adjacent, just one comfort tube 250 is provided with a blind hole 260 whilst the other comfort tubes 250 of this row have through-holes 255. The distribution of the comfort tubes 250 with blind holes 260 over the central region 206 is thus configured asymmetrically in the present case.

A network configured as non-woven fabric 225 is located between the two foam layers 211 and 221, said network representing a boundary between the two foam layers 211 and 221. The two foam layers 211 and 221 in each case are connected by a material and/or positive connection to the non-woven fabric 225.

The non-woven fabric 225 is preferably aligned perpendicular to the holes 255. In the present case, the non-woven fabric 225 is configured to be planar without holes, so that the non-woven fabric 225 passes through the holes 255. The non-woven fabric 225 may, however, also be configured to be perforated in the region of the holes 255.

Figure 11:
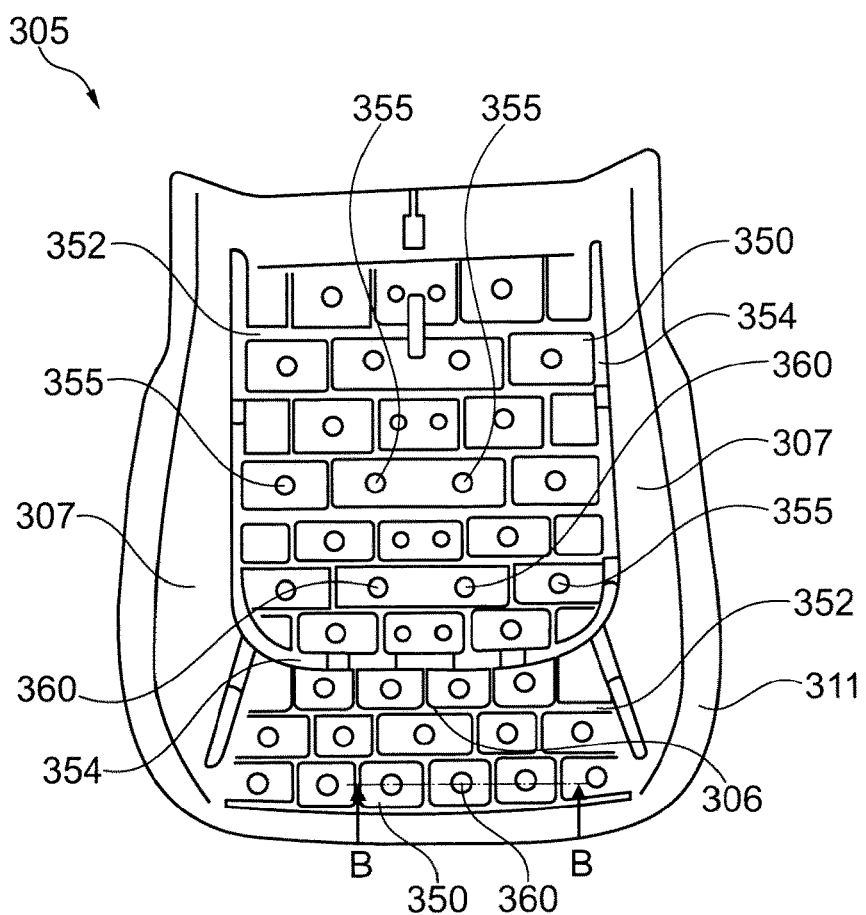
FIG. 11 is a plan view of a fourth exemplary embodiment.
Figure 12:
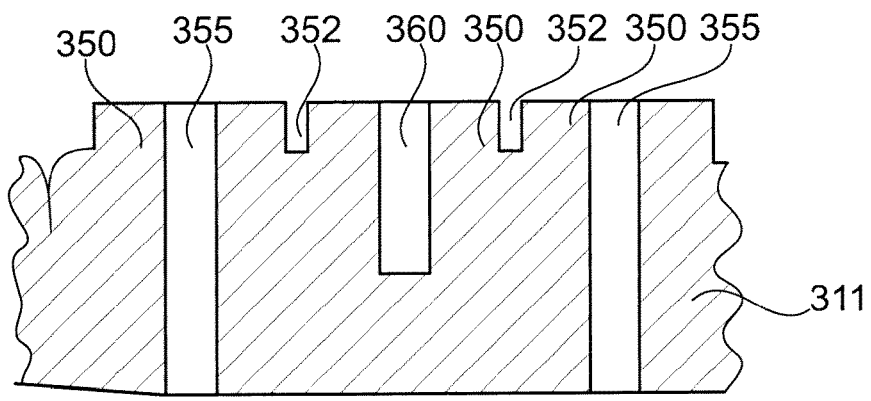
FIG. 12 is a sectional view through the fourth exemplary embodiment along the line B-B in FIG. 11.

A fourth exemplary embodiment shown in FIG. 11 substantially corresponds to the first exemplary embodiment, provided nothing different is disclosed below. Similar-acting components and contours have reference numerals increased by the value 300 relative to the first exemplary embodiment. A production method and a tool for the fourth exemplary embodiment also correspond in each case substantially to the previously described production method and tool.

The fourth exemplary embodiment is a foam part 305 for a seat cushion of the vehicle seat. The foam part 305 comprises a central region 306 and two side cheeks 307.

In contrast to the first exemplary embodiments, the foam part 305 is foamed from just one foam material so that it only has one foam layer, namely a first foam layer 311.

The foam part 305 has a plurality of comfort tubes 350 which have a substantially rectangular cross section. Individual comfort tubes 350 have an approximately square cross section. Recesses 352 having different depths are located between adjacent comfort tubes 350.

The comfort tubes 350 are divided into two areas of directly adjacent comfort tubes 350. The boundaries of the areas are substantially formed by cushion fastening channels 354. The cushion fastening channels 354 provide a plurality of through-holes for first fastening means fastened to a seat cover and second fastening means cooperating with these first fastening means and introduced into the foam part 305. The fastening means known per se, such as for example wires and hooks, are not shown in FIG. 11.

The comfort tubes 350 are connected integrally to the first foam layer 311 and form the portions of the central region 306 of the foam part 305 facing closest to the seat occupant. The comfort tubes 350 are arranged substantially perpendicular to the seat surface. The cross sections of the comfort tubes 350 in the present case are rectangular with rounded edges but may also have any other geometric shape.

For effective air-conditioning comfort, in each case a through-hole 355 or two through-holes 355 may be provided in some of the comfort tubes 350. The through-holes 355 in the present case are configured to be circular-cylindrical and are preferably located centrally in the associated comfort tube 350. Cross sections of the through-holes 355 deviating from a circular-cylindrical shape, for example polygonal cross sections or elliptical cross sections, are also possible. Comfort tubes 350 with two through-holes 355 positioned offset to one another and extending in parallel are provided in the center of the central region 306. Each of the through-holes 355 extends fully through the foam part 305 so that air is able to flow through the through-hole 355. The through-holes 355 extend substantially perpendicular to the surface of the central region 306.

Some of the comfort tubes 350 have in each case a blind hole 360 or two blind holes 360. Individual comfort tubes 350 may have a through-hole 355 and a blind hole 360. The blind holes 360 are in the present case configured to be circular-cylindrical and preferably are located centrally in the associated comfort tube 350. Cross sections of the blind holes 360 deviating from a circular-cylindrical shape, for example polygonal cross sections or elliptical cross sections, are also possible. Each of the blind holes 360 extends into the foam part 305, starting from a surface of the foam part 305, without fully extending through the foam part 305. The surface may be the surface of the foam part 305 facing the occupant, which is also denoted as the A-side. The surface may, however, also be the lower face of the foam part 305 remote from the seat occupant, which is also denoted as the B side. Each of the blind holes 360 is thus only open on one side, so that no air is able to flow through the blind hole 360. The blind holes 360 extend substantially perpendicular to the surface of the central region 306.

The depth of a blind hole 360 in a comfort tube 350 influences the flexibility of this comfort tube 350. The depth of a blind hole 360 in a comfort tube 350 may be smaller, the same or larger than the height of the comfort tube 350. Individual comfort tubes 350 arranged in the present case adjacent to the side cheeks 307 are formed from a solid material and thus have neither a through-hole 355 nor a blind hole 360.

The seating comfort and the seat air-conditioning may be influenced in a targeted manner by means of the depth of the blind holes 360 and/or a combination of blind holes 360 and through-holes 355 inside a foam part 305.

In a modification of the first to third exemplary embodiments, the side cheeks 7, 107, 207 consist of a third foam material which is more solid and/or harder relative to the foam material of the second foam layer 21, 221. The separating plane between the first foam layer 11, 111, 211 and the second foam layer 21, 221 thus does not extend through the side cheeks 7, 107, 207. In a modification of the fourth exemplary embodiment the side cheeks 307 consist of a second foam material.

The features disclosed in the present description, the claims and the drawings may be important both individually and in combination for the implementation of the invention in the different embodiments thereof. Thus, for example, possible variants for the seat cushion are a horizontal two-zone foam, a horizontal two-zone foam with an air-conditioning function, a horizontal two-zone foam with comfort tubes and a horizontal two-zone foam with comfort tubes and an air-conditioning function.

While specific embodiments of the invention have been shown and described in detail to illustrate the application of the principles of the invention, it will be understood that the invention may be embodied otherwise without departing from such principles.

The invention claimed is:

1. A foam part, for a vehicle seat, the foam part comprising;
    a first foam layer facing a user; and a second foam layer arranged below the first foam layer and connected in one piece to the first foam layer, the second foam layer consisting of a harder foam material relative to the foam material of the first foam layer, wherein the first foam layer has a plurality of comfort tubes facing a user, wherein the plurality of comfort tubes are surrounded by recesses and each of the comfort tubes comprises a hole or a plurality of holes, respectively, wherein at least one of the holes is configured as a blind hole and at least another of the holes is configured as a through hole that extends entirely through the foam part.

2. The foam part as claimed in claim 1, further comprising recesses, wherein the comfort tubes further comprise raised foam part regions and the recesses are respectively located between adjacent comfort tubes.

3. The foam part as claimed in claim 2, wherein the recesses are between 5 mm and 50 mm deep.

4. The foam part as claimed in claim 1, wherein at least one of the plurality of comfort tubes has just one blind hole.

5. The foam part as claimed in claim 1, wherein at least one comfort tube has a plurality of blind holes.

6. The foam part as claimed in claim 1, wherein at least one of the plurality of comfort tubes comprises a blind hole and a through-hole.

7. The foam part as claimed in claim 1 wherein at least one blind hole, starting from a surface of the foam part facing an occupant, extends into the foam part in a direction approximately perpendicular to the surface.

8. The foam part as claimed in claim 1, wherein at least one blind hole, starting from a surface of the foam part remote from an occupant, extends into the foam part in a closing direction of a tool for producing the foam part.

9. The foam part as claimed in claim 1, wherein a depth of at least one blind hole corresponds to a height of an associated comfort tube.

10. The foam part as claimed in claim 1, wherein a depth of at least one blind hole is less than a height of an associated comfort tube.

11. The foam part as claimed in claim 1, wherein a depth of at least one blind hole is greater than a height of the associated comfort tube.

12. The foam part as claimed in claim 1, wherein at least two blind holes have different depths relative to one another.

13. The foam part as claimed in claim 1, wherein at least one blind hole is 5 mm to 100 mm deep.

14. A vehicle seat having a backrest and a seat cushion, wherein the backrest or the seat cushion or both the backrest and the seat cushion comprises a foam part comprising:

a first foam layer facing a user; and a second foam layer arranged below the first foam layer and connected in one piece to the first foam layer, the second foam layer consisting of a harder foam material relative to the foam material of the first foam layer, wherein the first foam layer has a plurality of comfort tubes facing a user, wherein the plurality of comfort tubes are surrounded by recesses and each of the comfort tubes comprises a hole or a plurality of holes, respectively, wherein at least one of the holes is configured as a blind hole and at least another of the holes is configured as a through hole that extends entirely through the foam part.

15. The vehicle seat as claimed in claim 14, wherein a row of comfort tubes of the foam part of the seat cushion, furthest to the front in the direction of travel, has at least one blind hole.

16. The foam part as claimed in claim 14, further comprising recesses, wherein the comfort tubes are raised foam part regions and the recesses are respectively located between adjacent comfort tubes and the recesses are between 5 mm and 50 mm deep.

17. The foam part as claimed in claim 14, wherein at least one blind hole, starting from a surface of the foam part facing an occupant, extends into the foam part in a direction approximately perpendicular to the surface.

18. The foam part as claimed in claim 14, wherein a depth of at least one blind hole corresponds to a height of an associated comfort tube.

19. The foam part as claimed in claim 14, wherein a depth of at least one blind hole is less than a height of an associated comfort tube.

20. The foam part as claimed in claim 1, wherein the depth of at least one blind hole is greater than the height of the associated comfort tube.

\* \* \* \* \*